United States Patent
Chang et al.

(10) Patent No.: US 10,282,174 B2
(45) Date of Patent: May 7, 2019

(54) SOFTWARE LAYOUT PROCESSING LOCALIZATION

(75) Inventors: Molly Chang, Taipei (TW); Xiao Feng Ji, Beijing (CN); Michael R. O'Brien, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1187 days.

(21) Appl. No.: 13/435,045

(22) Filed: Mar. 30, 2012

(65) Prior Publication Data

US 2012/0254833 A1 Oct. 4, 2012

(30) Foreign Application Priority Data

Mar. 31, 2011 (CN) .......................... 2011 1 0080773

(51) Int. Cl.
*G06F 8/36* (2018.01)
*G06F 9/451* (2018.01)
*G06F 9/44* (2018.01)

(52) U.S. Cl.
CPC .............. *G06F 8/36* (2013.01); *G06F 9/4448* (2013.01); *G06F 9/454* (2018.02)

(58) Field of Classification Search
None
See application file for complete search history.

(56) References Cited

U.S. PATENT DOCUMENTS

| | | | | | |
|---|---|---|---|---|---|
| 5,678,039 | A | * | 10/1997 | Hinks | G06F 9/454 |
| 6,035,121 | A | * | 3/2000 | Chiu | G06F 9/454 |
| | | | | | 717/141 |
| 7,761,288 | B2 | * | 7/2010 | Parnell | G06F 9/454 |
| | | | | | 704/2 |
| 7,788,648 | B2 | * | 8/2010 | Bossom | G06F 9/454 |
| | | | | | 717/136 |
| 7,797,151 | B2 | * | 9/2010 | Apte | G06F 9/454 |
| | | | | | 704/8 |
| 2004/0113941 | A1 | * | 6/2004 | Sliwa | G06F 9/451 |
| | | | | | 715/744 |
| 2006/0195794 | A1 | * | 8/2006 | Sun | G06F 9/451 |
| | | | | | 715/762 |
| 2007/0033172 | A1 | * | 2/2007 | Williams | G06F 17/30067 |
| 2009/0031295 | A1 | * | 1/2009 | Zhao | G06F 9/44505 |
| | | | | | 717/172 |
| 2009/0063988 | A1 | * | 3/2009 | Graeff | G06F 8/38 |
| | | | | | 715/744 |

(Continued)

OTHER PUBLICATIONS

Kokkotos, "An Architecture for Designing Internationalized Software", 1997, IEEE (Year: 1997).*

(Continued)

*Primary Examiner* — Hossain M Morshed
(74) *Attorney, Agent, or Firm* — Cuenot, Forsythe & Kim, LLC (57) ABSTRACT

A method for processing software layout can include exporting layout setting information from design elements of a software; formatting the layout setting information, and storing it in a layout characteristic file; and importing the layout setting information in the layout characteristic file into design elements of another software. Layout information of each language can be stored in a customizable layout characteristic file.

18 Claims, 4 Drawing Sheets

(56) References Cited

U.S. PATENT DOCUMENTS

2012/0254833 A1* 10/2012 Chang .................... G06F 9/454
                                                         717/113

OTHER PUBLICATIONS

Fritsche, S., "Customizing the Logon User Interface of SAP Enterprise Portal," [online] SAP Community Network, SAP AG, Inc., Sep. 2, 2003 [retrieved Mar. 29, 2012] retrieved from the Internet: <http://www.sdn.sap.com/irj/scn/index?rid=/library/uuid/371e9d90-0201-0010-c39c-fd2956154ab3?m> 2 pgs.

* cited by examiner

SOFTWARE LAYOUT PROCESSING LOCALIZATION

CROSS-REFERENCE TO RELATED APPLICATIONS

This application claims the benefit of China Application Number 201110080773.1 filed on Mar. 31, 2011, which is fully incorporated herein by reference.

BACKGROUND

Software localization refers to a process for transforming and customizing a software product according to language, usage habit and so on of end users, generally including interpreting and translating the user interface and related documents, online help menus and so on from the language in the original country into another language.

The localization of the software user interface (UI) is a time-consuming process. In addition to interpreting texts, since the length of the text of each language is not the same, a localizing engineer still needs to readjust sizes and positions of elements of the user interfaces in various languages, and these operations need to be performed once respectively for each different localization language.

Typically, we manually adjust design elements of the previous software version. For example, for an application software with the original language of English, during the process for performing the localization for Chinese, we manually adjust the sizes and the positions of the design elements in the user interface for the Chinese version of the software version v1, to obtain the software of Chinese version. However, after the English application software issues a version v2, during the process for performing the localization for Chinese on the version v2, we have to adjust the sizes, the positions and so on of the elements in the version v2 in a manual adjustment manner again. If a software issues localization versions for a plurality of countries, it is needed to update the localization versions for each different language continuously.

Thus, it is desirable to provide a solution for reducing efforts made in adjusting software layout during the process of the software localization.

BRIEF SUMMARY

With respect to the problems existing in the current software localization process, one embodiment of the invention provides a method for processing software layout. The method can include exporting layout setting information from design elements of a software; formatting the layout setting information, and storing it in a layout characteristic file; and importing the layout setting information in the layout characteristic file into design elements of another software.

Another embodiment of the invention can include a system for processing software layout. The system can include a processor configured to initiate executable operations. The executable operations can include exporting layout setting information from design elements of a software; formatting the layout setting information, and storing the layout setting information in a layout characteristic file; and importing the layout setting information in the layout characteristic file into design elements of another software.

Another embodiment of the invention can include a computer program product for processing software layout. The computer program product can include a computer readable storage medium having stored thereon program code that, when executed, configures a processor to perform executable operations. The executable operations can include exporting layout setting information from design elements of a software; formatting the layout setting information, and storing the layout setting information in a layout characteristic file; and importing the layout setting information in the layout characteristic file into design elements of another software.

BRIEF DESCRIPTION OF THE SEVERAL VIEWS OF THE DRAWINGS

The above and other objects, features and advantages of the invention will be more apparent in combination with more detailed description of the exemplary embodiments of the invention, with reference to the appended drawings, in which.

DETAILED DESCRIPTION

The inventive arrangements will be described with reference to the method and the apparatus of the embodiments of the invention, wherein, each block in the flowcharts and/or the block diagrams and the combination of various blocks in the flowcharts and/or the block diagrams may be implemented by computer program instructions. These computer program instructions may be provided to a processor of a universal computer, a dedicated computer or other programmable data processing apparatus, so as to produce a machine, so that means for implementing functions/operations defined in the blocks in the flowcharts and/or the block diagrams are generated by these instructions executed by the computer or other programmable data processing apparatus.

These computer program instructions may also be stored in a computer readable medium capable of instructing the computer or other programmable data processing apparatus to operate in a specific manner, so that the instructions stored in the computer readable medium generate a product including instruction means for implementing functions/operations defined in the blocks in the flowcharts and/or the block diagrams.

The computer program instructions may also be loaded into the computer or other programmable data processing apparatus, so that a series of operating steps are executed on the computer or other programmable data processing apparatus, to generate a process implemented by the computer, so that the instructions executed on computer or other programmable data processing apparatus provide the processes of the functions/operations defined in the blocks in the flowcharts and/or the block diagrams.

A data processing system and/or apparatus, e.g., a computer, can include one or more processors coupled to memory elements through a system bus or other suitable circuitry. As such, the data processing system can store program code within the memory elements. The processor can execute the program code accessed from the memory elements via the system bus. In one aspect, for example, the data processing system can be implemented as a computer that is suitable for storing and/or executing program code. It should be appreciated, however, that the data processing system can be implemented in the form of any system including a processor and memory that is capable of performing the functions and/or operations described within this specification.

The memory elements can include one or more physical memory devices such as, for example, local memory and one or more bulk storage devices. The local memory refers to RAM or other non-persistent memory device(s) generally used during actual execution of the program code. The bulk storage device(s) can be implemented as a hard drive or other persistent data storage device. The data processing system also can include one or more cache memories (not shown) that provide temporary storage of at least some program code in order to reduce the number of times program code must be retrieved from bulk storage device during execution.

Input/output (I/O) devices such as a keyboard, a display, and a pointing device optionally can be coupled to the data processing system. The I/O devices can be coupled to the data processing system either directly or through intervening I/O controllers. One or more network adapters also can be coupled to the data processing system to enable the data processing system to become coupled to other systems, computer systems, remote printers, and/or remote storage devices through intervening private or public networks. Modems, cable modems, and Ethernet cards are examples of different types of network adapters that can be used with the data processing system.

Figure 1:
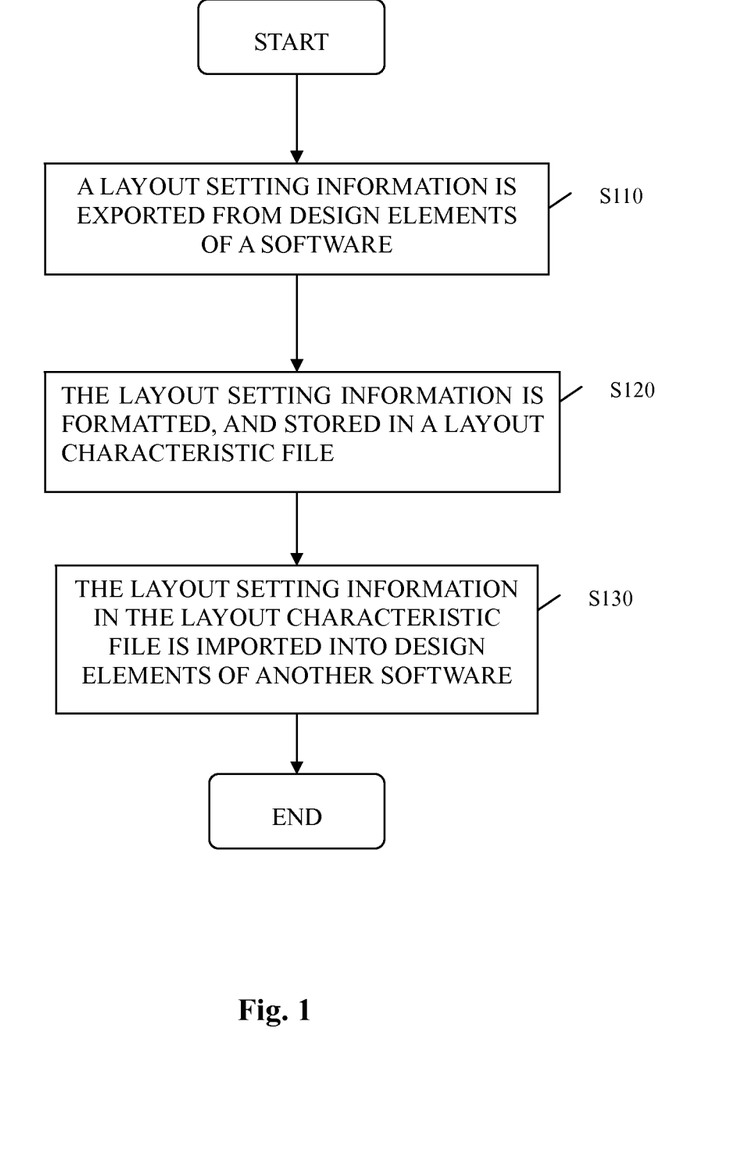
FIG. 1 shows a flowchart of a method for processing software layout according to an embodiment of the invention.

One or more embodiments of the present invention relate to a layout adjusting method of a software, and in particular, to a method and a system for processing software layout during the localization of user interface of the software. An illustrative embodiment of the invention will be explained below with reference to the drawings. FIG. 1 shows a flowchart of a method for processing software layout according to an embodiment of the invention. First, at step S110, a layout setting information is exported from design elements of a software. At step S120, the layout setting information is formatted, and stored in a layout characteristic file. At step S130, the layout setting information in the layout characteristic file is imported into design elements of another software. It is known by the person skilled in the art that the other software herein may be a localized version of the software. For example, taking a scene of localization of a software of English version as an example, the software herein may be the user interface of the English version of an application software, while the other software herein may be the user interface of the version to be localized, such as Chinese version. Further, for example, the original software herein may be a localized version of an application software, while the other software is a localized version of another same language or another different language of the application software.

Thus, for the application software of a current version, the layout information of the application software of the current version may be exported by using the method of the invention, and stored in a layout characteristic file, so as to applying the layout information of the application software of the current version to future versions.

Figure 2:
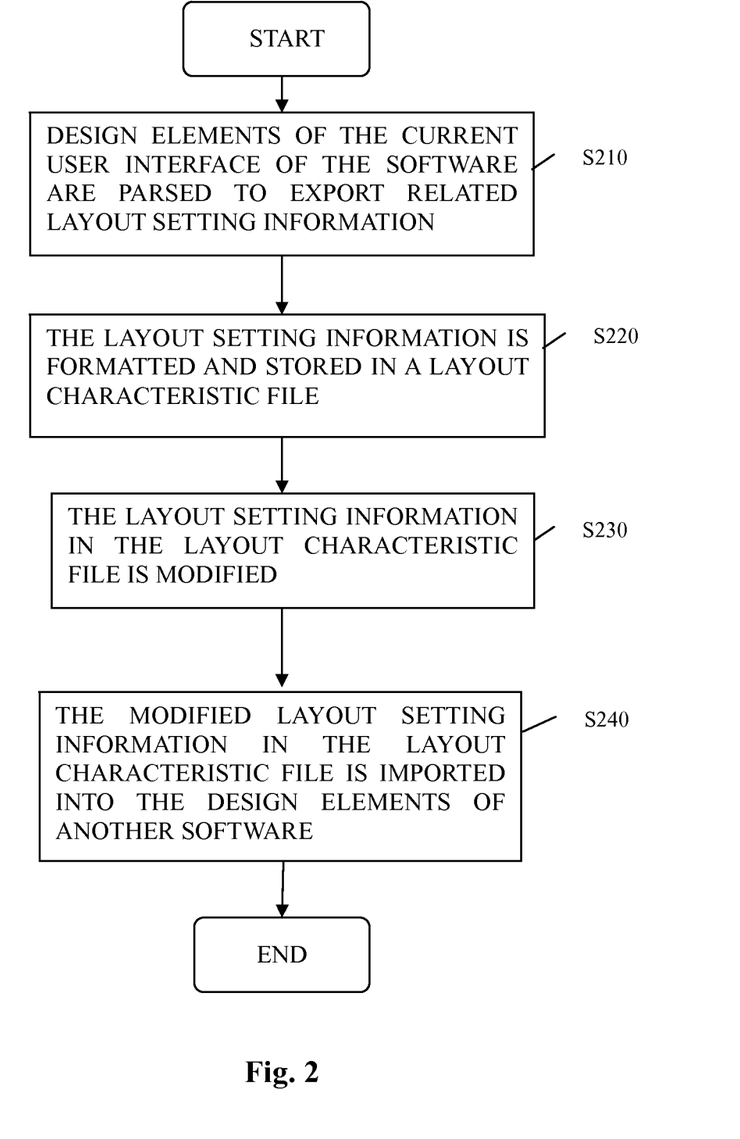
FIG. 2 shows a flowchart of a method for processing software layout according to another embodiment of the invention.

FIG. 2 shows a flowchart of a method for processing software layout according to another embodiment of the invention.

First, at step S210, design elements of the current user interface of the software are parsed to export related layout setting information. The design elements herein may include at least one of control or object. At first, the at least one control or object of the design elements is analyzed, and the layout setting information is exported according to the at least one control or object of the design elements. According to one embodiment of the invention, the design elements including layout setting in the software may be scanned one by one. Here, the scanning on the software sometimes will need a parser for Application Programming Interface (API) or related programming source code of a particular product, such as HTML parser.

At step S220, the layout setting information is formatted, to obtain a layout characteristic file with a standard text format. According to one embodiment of the invention, the layout information of the design elements is extracted into the layout characteristic file in a standard interpreting format, in which, the standard interpreting format is a single text resource format which can be edited by any text editing tool. Hierarchical key names are generated for the design elements, and the hierarchical key names are associated with the layout setting information of the design elements, and stored in the layout characteristic file. The layout characteristic file has a standard format, for example, key=value. Key is a hierarchical key name for storing path, type and subtype of the layout setting, and value is a specific value. For example, some examples in the layout characteristic file are given below:

SubForms.(FixupCalendarEntryDetailsDlg)|
FixupCalendarEntryDetailsDlg.Field.dispRepeatRepairDates.-width=5760
  Forms.(AllAddressHelper).Field.OfficeState.height=317
  SubForms.(ICALCompatibilityCounterDialog)|
ICALCompatibilityCounterDialog.Button.Counter.lines=1
  Views.($OfflineCalendar)|OfflineCalendar.Colum.-SourceName.display-width=109
  Forms.Reply|Reply.Table.ReplyToTable.TableCell.rtt1.left-margin=2611

The layout setting information stored in the layout characteristic file can be imported into design elements of the next version. In addition, the layout characteristic file can be further modified at step S230. For example, the layout information can be customized or modified by using the text editing tool. At step S240, the modified layout setting information in the layout characteristic file is imported into the design elements of another version.

According to one embodiment of the invention, when the layout setting information is exported from the design elements of the user interface of the software, the design elements including the layout setting information can be recognized by scanning the software, so that the hierarchical key names are generated only for the design elements including the layout setting information, and the key name is associated with the corresponding layout setting information.

How to obtain the layout characteristic file of the application program by using the method shown in FIG. 2 will be explained through the particular embodiment below:

Example 1, applying the invention to Lotus Notes Database: first, activating the function, using Notes C API, scanning a Notes Form, whose name is AllAddressHelper, then scanning Control Elements therein one by one, for example, we scan a Button with a label of "OfficeSate" with a height of 317 twips (similarly, the attribute value can be read out by Notes C API), so the generated layout configuration information is as follows (the separator is "."):

Forms.(AllAddressHelper).Button.OfficeState.
 height=317

We may use other separators to represent them, for example, we use "//" as the separator:

Forms//(AllAddressHelper)//Button//OfficeState//
height=317 or use a markup language to represent them, such as XML:

```
<Forms>
    <(AllAddressHelper)>
        <Button>
            <OfficeState>
                <height>317</height>
            </OfficeState>
        </Button>
    </(AllAddressHelper)>
</Forms>
```

The layout characteristic file of the Lotus Notes Database is obtained through the above process.

Example 2, applying the invention to HTML page: it is assumed that the HTML file name is Sample.html, in which, HTML codes are included:

```
<Table>
    <tr>
        <td id="company_name" width=6.56cm>International Business Machine</td>
    </tr>
</Table>
```

In Chinese environment, the HTML codes should be:

```
<Table id="information">
    <tr>
        <td id="company_name" width=3.38cm>    </td>
    </tr>
</Table>
```

First, activating the function, using an HTML parser, to scan the HTML codes under the Chinese environment, so that the following layout configuration information can be obtained:

Sample_html.table.information.tablecell.company_
 name.width=3.38 cm

Similarly, the hierarchical structure on the left of the equation may also use other separators or markup languages to represent them. Through the above process, the layout characteristic file of the HTML page is obtained. Thus, after the software is upgraded for versions, the layout configuration information stored in the layout characteristic file can be imported into the design elements of the next version, to reapply the layout configuration to the software product of the new version. Alternatively, the text editing tool can be used to customize the layout information, and then the layout information is applied back to the design elements.

The invention enables reapplying the layout setting of the design elements, which obviously reduce the cost of the localization largely.

Figure 3:
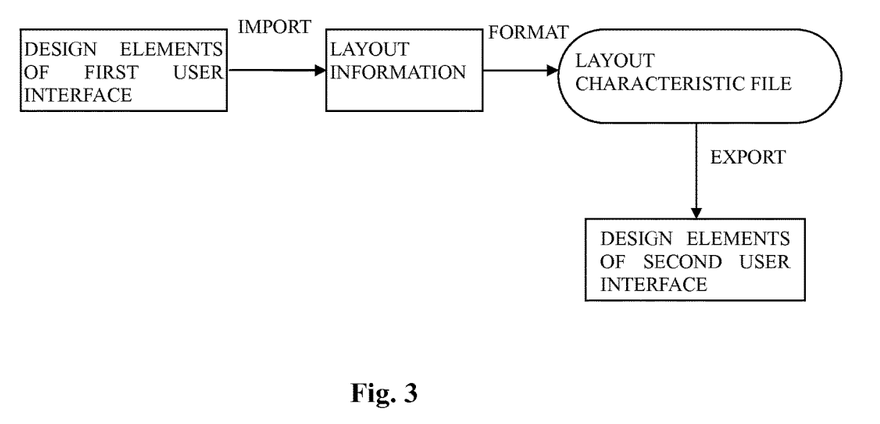
FIG. 3 shows a schematic view for using a method for processing software layout according to an embodiment of the invention to generate a layout characteristic file.

The further description of the invention will be performed below by some particular examples. FIG. 3 is a schematic view regarding how to generate a layout characteristic and apply it to suitable design elements.

In the schematic view of FIG. 3, in the application scene of the localization, for example, for an application software with a original language of English, a first user interface may be an interface of the application software which has been localized. Layout information of the localized application software of the previous version can be exported from the design elements of the application software which has been localized, and the layout information is formatted according to the formatting manner as described above, to obtain the layout information of the localized application software. Then, during the localization of the application software of a new version, i.e., a second user interface, the layout characteristic file storing the layout information of the previous version can be exported into the design elements of the localized application software of the current new version, so that the design elements of the localized application software of the current new version can have the correct layout information.

Further for example, according to yet another embodiment of the invention, for an application software with an original language of English, during its localization, the application program needs to be interpreted into a plurality of languages, such as Chinese, Japanese, Spanish, French and so on. If after comparison, it is found the localization version of Chinese and the localization version of Japanese have possible similar layout information due to the similarity between the two languages, in this case, after the application program is localized to Chinese and the layout setting is adjusted accordingly, the method of the invention can be used to export the layout setting information from the application program localized to Chinese, store it in a layout characteristic file, during the Japanese localization of the application program, import the layout setting information stored in the layout characteristic file into the application program of Japanese, so that it is not needed to readjust the sizes and the positions and so on of the elements of the user interface of the Japanese application program. Alternatively, if after comparison, it is found that the layout information of the two localization languages are not the same, but may have a certain correspondence, the layout setting information in the layout characteristic file can be adjusted according to the correspondence, and then the adjusted layout setting information is applied to the application program of the corresponding localization language.

Figure 4:
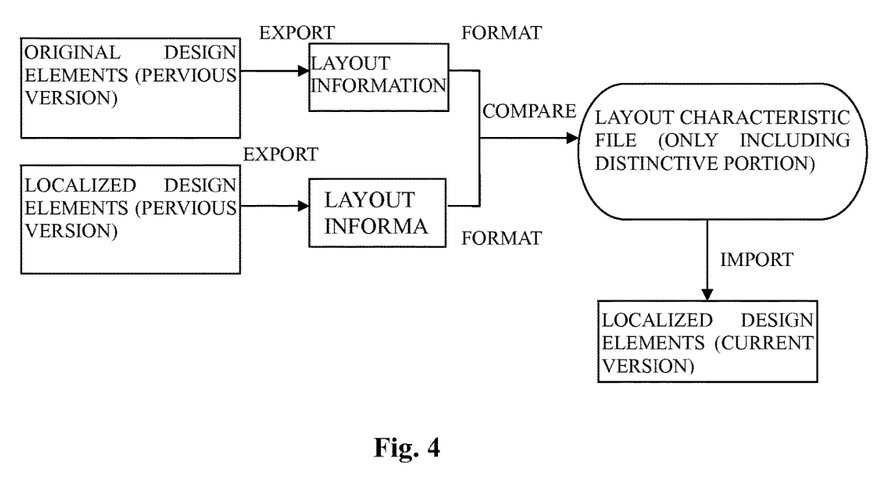
FIG. 4 shows a schematic view for using a method for processing software layout according to another embodiment of the invention to generate a layout characteristic file.

FIG. 4 shows another schematic diagram for using the invention on a software localization procedure.

For example, for an application software with an original language of English, Layout information of the application software of the version can be exported from the original English design elements, and the layout information is formatted according to the formatting manner as described above, to obtain the layout information of the original application software, meanwhile, layout information of the localized application software of the previous version can be exported from the design elements which have been localized, and the layout information is formatted according to the formatting manner as described above, to obtain the layout information of the localized application software.

Then, the layout information of the original application program and the layout information of localized application program are compared, and the different portion therein (referred to distinctive layout information, below) is stored in a layout characteristic file. During the localization process of the application software of a new version, the above layout characteristic file storing the distinctive layout information can be exported into the design elements of the localized application program of the current version, so that the design elements of the localized application software of the current version can have the correct layout information.

It is known by the person skilled in the art that, although the process for processing software layout was described herein by taking the localization of a software as an example, the invention is not limited to the localization of the same software, it can be applied to the adjustment of the layouts between different softwares. For example, if a second software and a first software are different softwares, as long as their layout information has any portion to be reused mutually, the invention can be still used to perform the adjustment of the layout.

Figure 5:
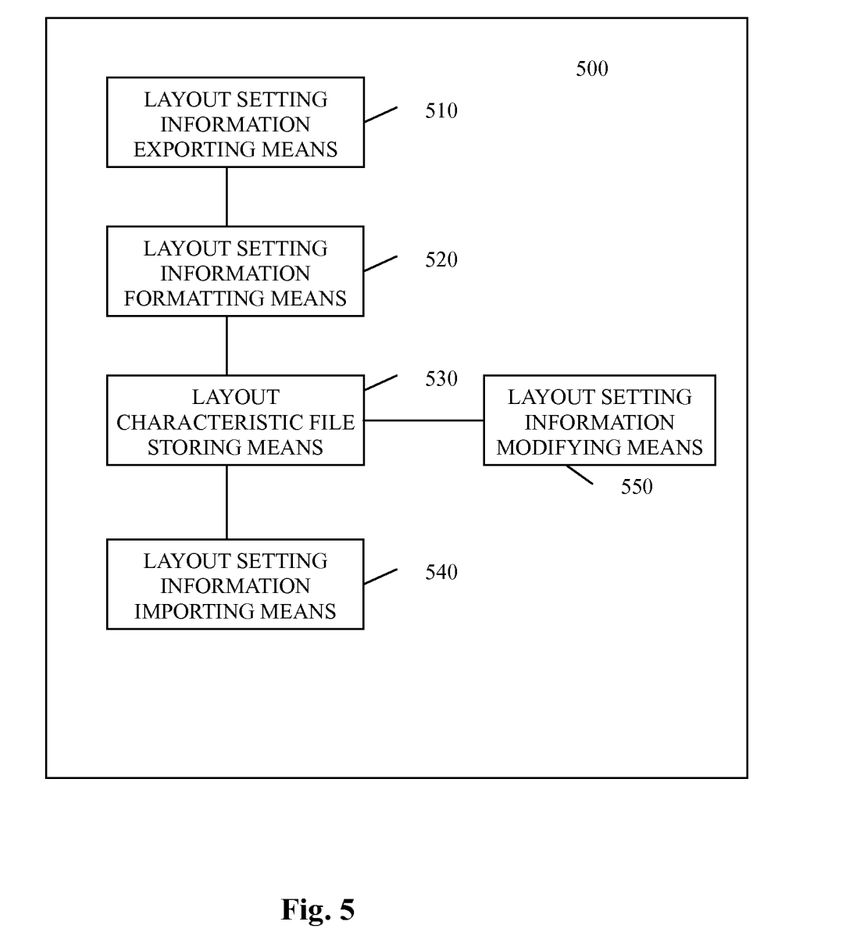
FIG. 5 shows a block diagram of a system for processing software layout according to an embodiment of the invention.

FIG. 5 shows a block diagram of a system 500 for processing software layout according to an embodiment of the invention. The system 500 includes following means: a layout setting information exporting means 510, configured to export layout setting information from design elements of a software; a layout setting information formatting means 520, configured to format the layout setting information; a layout characteristic file storing means 530, configured to store the layout characteristic file; and a layout setting information importing means 540, configured to import the layout setting information in the layout characteristic file into design elements of another software.

The system 500 may further include a layout setting information modifying means 550, configured to modify the layout setting information in the layout characteristic file, wherein, the layout setting information importing means 540 imports the modified layout setting information in the layout characteristic file into the design elements of the other software.

According to another embodiment of the invention, the design elements may include at least one control or object, wherein, the layout setting information exporting means 50 is further configured to: analyze the at least one control or object of the design elements; and export the layout setting information according to the at least one control or object of the design elements.

According to another embodiment of the invention, the layout setting information formatting means is further configured to: generate hierarchical key names for the design elements; and associate the hierarchical key names with the layout setting information of the design elements, and store them in the layout characteristic file.

According to another embodiment of the invention, the layout setting information exporting means is further configured to scan the software to recognize the design elements including the layout setting information; and the layout setting information formatting means is further configured to generate the hierarchical key names for the design elements including the layout setting information.

The embodiments of the invention can, by storing layout information of each language in a customizable layout characteristic file, effectively solve the inheriting problem of the interface layouts between the language software of different versions, so as to make them remain in the same layout style.

The embodiments of the invention also provide a storage medium or signal carrier, in which instructions for executing the method according to the invention are included.

The flowcharts and the block diagrams in the drawings illustrate the possible architecture, the functions and the operations of the system, the method and the computer program product according the embodiments of the invention. In this regard, each block in the flowcharts or block diagrams may represent a portion of a module, a program segment or a code, and the portion of the module, the program segment or the code includes one or more executable instructions for implementing the defined logical functions. It should be also noted that in some implementations as alternatives, the functions labeled in the blocks may occur in an order different from the order labeled in the drawings. For example, two sequentially shown blocks may be substantially executed in parallel in fact, and they sometimes may also be executed in a reverse order, which is defined by the referred functions. It also should be also noted that, each block in the flowcharts and/or the block diagrams and the combination of the blocks in the flowcharts and/or the block diagrams may be implemented by a dedicated system based on hardware for executing the defined functions or operations, or may be implemented by a combination of the dedicated hardwares and computer instructions.

The person skilled in the art will know that the invention may be embodied as a system, a method or a computer program product. Thus, the invention can be implemented in particular in following forms, i.e., a whole hardware, a whole software (including firmwares, residing softwares, microcodes), or a combination of the software parts normally called "circuit", "module" or "system" in the text and the hardware parts. In addition, the invention can also adopt the form of computer program product in any medium of expression, with computer-usable program codes included in the medium.

Any combination of one or more computer-usable or computer-readable mediums can be used. The computer-usable or computer-readable mediums can be, but not limited to for example, electric, magnetic, optic, electro-magnetic, infrared, or semiconductor system, apparatus, device or transmission medium. More particular examples of the computer-readable mediums include: electric connection with one or more wires, portable computer disk, hard disk, Random Access Memory (RAM), Read Only Memory (ROM), Erasable Programmable Read Only Memory (EPROM or flash memory), optical fiber, portable Compact Disk Read Only Memory (CD-ROM), optical storage device, such as transmission medium supporting Internet or Intranet, or magnetic storage device. It is appreciated that, the computer-usable or computer-readable mediums can be even papers or other suitable mediums with programs printed thereon, because such paper or other mediums can be for example, electrically scanned to electrically obtain the program, and then compiled, interpreted or processed in a suitable manner, and stored in a computer memory as necessary. In the context of this document, the computer-usable or computer-readable medium can be any medium for containing, storing, transferring, transporting, or transmitting programs to be used by instruction execution system, apparatus or device, or to be associated with the instruction execution system, apparatus or device. The computer-usable medium may include data signal embodying the computer-usable program codes, transmitted in the base band or as a part of the carrier. The computer-usable program codes can be transmitted by any suitable medium, including, but not limited to, wireless, wired, cable, RF and so on.

The computer program codes for performing the operations of the invention can be composed in any combination of one or more programming languages including Object- Oriented programming languages, such as Java, Smalltalk, C++ and so on, and normal process programming languages, such as "C" programming language or like programming languages. The program codes can be executed entirely on the user's computer, partially on the user's computer, as one independent software package, partially on the user's computer and partially on a remote computer, or entirely on the remote computer or a Web server. In the latter case, the remote computer can be connected to the user's computer by any type of network, including Local Area Network (LAN) or Wide Area Network (WAN), or to external computers (by for example the Internet web service provider using Internet).

The invention is described in detail with combination to the above preferred solutions, but it can be understood that the above embodiments are only for illustrating but not limiting the invention. The person skilled in the art may make various modifications to the shown embodiments of the invention without departing from the scope and the spirit of the invention.

What is claimed is:

1. A method for processing software layout, comprising:
exporting layout setting information from design elements of a control in a software;
formatting, using a processor, the layout setting information, and storing the layout setting information in a layout characteristic file; and
importing the layout setting information in the layout characteristic file into design elements of another software, wherein
the software is a first version of the software,
the another software is a first version of the another software, and
responsive to a second version of the software being localized into a second version of the another software, the layout setting information of the first version of the software being imported into design elements of the second version of the another software.

2. The method according to claim 1, wherein,
the importing the layout setting information in the layout characteristic file into the design elements of the other software further includes:
modifying the layout setting information in the layout characteristic file; and
importing the modified layout setting information in the layout characteristic file into the design elements of the other software.

3. The method according to claim 1, wherein,
the exporting the layout setting information from the design elements of the software further includes:
analyzing the control; and
exporting the layout setting information according to the control.

4. The method according to claim 1, wherein,
the formatting the layout setting information, and storing it in the layout characteristic file includes:
generating hierarchical key names for the design elements; and
associating the hierarchical key names with the layout setting information of the design elements, and storing them in the layout characteristic file.

5. The method according to claim 4, wherein,
the exporting the layout setting information from the design elements of the software further includes scanning the software to recognize the design elements including the layout setting information; and wherein the generating the hierarchical key names for the design elements further includes generating the hierarchical key names for the design elements including the layout setting information.

6. The method according to claim 1, wherein,
the software is a localized version of one application software, and
the other software is another localized version of a same language of the application software.

7. The method according to claim 1, wherein,
the software is a localized version of one application software, and
the other software is another localized version of a different language of the application software.

8. A system for processing software layout, comprising:
a processor configured to initiate executable operations comprising:
exporting layout setting information from design elements of a control in a software;
formatting the layout setting information, and storing the layout setting information in a layout characteristic file; and
importing the layout setting information in the layout characteristic file into design elements of another software, wherein
the software is a first version of the software,
the another software is a first version of the another software, and
responsive to a second version of the software being localized into a second version of the another software, the layout setting information of the first version of the software being imported into design elements of the second version of the another software.

9. The system according to claim 8, wherein,
the importing the layout setting information in the layout characteristic file into the design elements of the other software further includes:
modifying the layout setting information in the layout characteristic file; and
importing the modified layout setting information in the layout characteristic file into the design elements of the other software.

10. The system according to claim 8, wherein,
the exporting the layout setting information from the design elements of the software further includes:
analyzing the control; and
exporting the layout setting information according to the control.

11. The system according to claim 8, wherein,
the formatting the layout setting information, and storing it in the layout characteristic file includes:
generating hierarchical key names for the design elements; and
associating the hierarchical key names with the layout setting information of the design elements, and storing them in the layout characteristic file.

12. The system according to claim 11, wherein,
the exporting the layout setting information from the design elements of the software further includes scanning the software to recognize the design elements including the layout setting information; and
wherein the generating the hierarchical key names for the design elements further includes generating the hierarchical key names for the design elements including the layout setting information.

13. The system according to claim 8, wherein, the software is a localized version of one application software, and the other software is another localized version of a same language of the application software.

14. The system according to claim 8, wherein, the software is a localized version of one application software, and the other software is another localized version of a different language of the application software.

15. A computer program product for processing software layout, the computer program product comprising:

a computer readable storage medium having stored thereon program code that, when executed, configures a processor to perform executable operations comprising:

exporting layout setting information from design elements of a control in a software;

formatting the layout setting information, and storing the layout setting information in a layout characteristic file; and importing the layout setting information in the layout characteristic file into design elements of another software, wherein the computer readable storage medium is not a transitory, propagating signal per se, the software is a first version of the software, the another software is a first version of the another software, and responsive to a second version of the software being localized into a second version of the another software, the layout setting information of the first version of the software being imported into design elements of the second version of the another software.

16. The computer program product according to claim 15, wherein, the importing the layout setting information in the layout characteristic file into the design elements of the other software further includes:

modifying the layout setting information in the layout characteristic file; and importing the modified layout setting information in the layout characteristic file into the design elements of the other software.

17. The computer program product according to claim 15, wherein, the exporting the layout setting information from the design elements of the software further includes:

analyzing the control; and exporting the layout setting information according to the control.

18. The computer program product according to claim 15, wherein, the formatting the layout setting information, and storing it in the layout characteristic file includes:

generating hierarchical key names for the design elements; and associating the hierarchical key names with the layout setting information of the design elements, and storing them in the layout characteristic file.

* * * * *